United States Patent
Di Carlo

(10) Patent No.: US 12,194,652 B2
(45) Date of Patent: Jan. 14, 2025

(54) HYDRAULIC FAST-COUPLING ASSEMBLY FOR COUPLING A WATER JET CUTTING SYSTEM WITH A SUPPORTING HEAD OF A MACHINE USED FOR THE WORKING OF SHEET MATERIALS

(71) Applicant: SASSOMECCANICA S.P.A., Monteprandone (IT)

(72) Inventor: Renato Di Carlo, Monteprandone (IT)

( * ) Notice: Subject to any disclaimer, the term of this patent is extended or adjusted under 35 U.S.C. 154(b) by 649 days.

(21) Appl. No.: 17/494,253

(22) Filed: Oct. 5, 2021

(65) Prior Publication Data

US 2022/0120369 A1    Apr. 21, 2022

(30) Foreign Application Priority Data

Oct. 15, 2020   (IT) .................. 102020000024406

(51) Int. Cl.
*B26F 3/00* (2006.01)
*F16L 37/40* (2006.01)

(52) U.S. Cl.
CPC .............. *B26F 3/004* (2013.01); *F16L 37/40* (2013.01)

(58) Field of Classification Search
CPC .... B26F 3/004; B26F 3/008; B26F 2003/006; B26F 1/26; B24C 1/045; B24C 5/02; B24C 5/04; F16L 37/50; F16L 37/505; F16L 15/02
See application file for complete search history.

(56) References Cited

U.S. PATENT DOCUMENTS

| 5,209,406 A | 5/1993 | Johnson | |
| 2013/0112056 A1* | 5/2013 | Chacko | B24C 5/02 83/177 |
| 2014/0329445 A1 | 11/2014 | Traini et al. | |

FOREIGN PATENT DOCUMENTS

| EP | 3620281 A1 | 3/2020 |
| KR | 20100063546 A * | 6/2010 |

OTHER PUBLICATIONS

Search Report for Priority Italian Application No. 102020000024406, dated Jul. 7, 2021.

* cited by examiner

*Primary Examiner* — Jennifer S Matthews
(74) *Attorney, Agent, or Firm* — Egbert, McDaniel & Swartz, PLLC

(57) ABSTRACT

Hydraulic fast-coupling assembly for coupling a water jet cutting system with a supporting head of a machine. The fast-coupling assembly has a coupling element suitable for being integral with the water jet cutting system and for being coupled with the supporting head. The coupling element has a central duct. A mobile stem has an internal duct and is suitable for being slidably mounted inside a seat obtained on the supporting head. The peculiarity of the hydraulic fast-coupling assembly is that it has at least one coupling removably connected to the mobile stem and/or to the coupling element. The at least one coupling has an axial duct that puts in communication the internal duct and the central duct.

9 Claims, 7 Drawing Sheets

HYDRAULIC FAST-COUPLING ASSEMBLY FOR COUPLING A WATER JET CUTTING SYSTEM WITH A SUPPORTING HEAD OF A MACHINE USED FOR THE WORKING OF SHEET MATERIALS

CROSS-REFERENCE TO RELATED APPLICATIONS

Not applicable.

BACKGROUND OF THE INVENTION

1. Field of the Invention

The present invention relates to a fast-coupling assembly for coupling a water jet cutting system with a supporting head of a machine used for the working of sheet materials.

The present invention also relates to a machine used for the working of sheet materials wherein the head and the cutting system are connected by means of said fast-coupling assembly.

2. Description of Related Art Including Information Disclosed Under 37 CFR 1.97 and 37 CFR 1.98

Computer numerical control (CNC) machines are currently used to carry out processing operations on sheet materials, such as finishing, cutting or engraving operations. Said CNC machines comprise a supporting structure composed of a pair of side frames that centrally support an upper beam capable of translating above a workbench whereon the sheet to be processed is placed. The beam is provided with a sliding carriage that moves along the beam in orthogonal direction with respect to the two side frames. A mobile upright is connected to the sliding carriage in order to support a supporting head for one or more tools used for working the sheet placed on the workbench.

Rotary cutters or discs mounted on the supporting head are usually employed to carry out cutting operations.

Alternatively, said tools may consist of a high-pressure water jet cutting system.

In the first case, the supporting head will be equipped with a spindle connected to the rotary tool. In the second case, the supporting head will be equipped with a high-pressure hydraulic system and with a nozzle that delivers the liquid capable of cutting the sheet on the workbench. Therefore, the water jet technology consists of directing a water jet at a very high pressure (between 3000 bar and 4000 bar) on the sheet in order to cut or engrave the sheet.

It should be noted that the choice of using the rotary tools or the water jet cutting system depends on the type of cut or operation to be carried out on the sheet.

For example, fast cutting operations can be carried out with rotary tools, whereas extremely precise cuts can be made with water jet cutting systems.

Companies are usually equipped with two different machines, namely a machine equipped with a supporting head with rotary tools and a machine equipped with a supporting head with a water jet cutting system.

Evidently, the fact of having two separate machines, which only differ in the supporting head, in the production chain is extremely expensive for a company.

The same applicant has devised a machine with interchangeable tools, which is described in EP3620281. More precisely, the machine comprises fast-coupling/uncoupling means suitable for being coupled with respective fast-coupling/uncoupling means of cutting means with rotary tools or of a water jet cutting system. Therefore, such a solution makes it possible to alternatively use either the water jet cutting system or the cutting means with rotary tools, depending on the type of cutting or machining operation to be carried out.

The connection of the water jet cutting system to the supporting head requires special couplings that are suitable for withstanding the high pressure of the liquid that passes through the couplings.

In particular, a hydraulic fast-coupling assembly is provided to connect the water jet cutting system and the supporting head, said hydraulic fast-coupling assembly comprising:
- a coupling element suitable for being integral with the water jet cutting system and for being attached to the supporting head; the coupling element comprises a central duct suitable for being in fluid communication with a nozzle of the water jet cutting system; and
- a mobile stem suitable for being slidably mounted inside a seat formed on the supporting head; the mobile stem comprises an internal duct and is suitable for being moved inside the seat between a retracted position, wherein said internal duct and said central duct are not connected to each other, and an extracted position, wherein said internal duct and said central duct are connected to each other.

The coupling of the mobile stem and the coupling element is made by means of a conical mouth formed on the movable stem and a conical tip formed on the coupling element. When the mobile stem is placed in said extracted position, the conical tip is inserted into the conical mouth, putting the two ducts in communication. Both the conical tip and the conical mouth are made of metal.

The applicant has noted that such a configuration of the fast-coupling assembly is impaired by some drawbacks.

In particular, said drawbacks are encountered when impurities, surface oxidation or small dents are present between the contact surfaces (of the conical mouth and of the conical tip).

The surface inaccuracies generate leaks that, due to the high pressures at which the machine works, are converted into mist and fumes that affect the operation of the water jet cutting means.

It is obvious that in such a case it is necessary to replace either one or two elements of the coupling element. Such a replacement is extremely delicate and complex and therefore must be carried out by a qualified technician.

BRIEF SUMMARY OF THE INVENTION

The object of the present invention is to devise a hydraulic fast-coupling assembly which is easy to replace in case of imperfections or wear of the coupling surfaces in contact with each other.

Otherwise said, the purpose of the present invention is to devise fast-coupling assembly wherein the replacement of the fast-coupling assembly can be performed by any user without requiring the presence of a qualified operator.

This purpose is achieved in accordance with the invention having the characteristics listed in the appended independent claim 1.

Advantageous embodiments appear from the dependent claims.

The hydraulic fast-coupling assembly according to the invention is defined by claim 1.

BRIEF DESCRIPTION OF THE SEVERAL VIEWS OF THE DRAWINGS

For the sake of explanatory clarity, the description of the hydraulic fast-coupling assembly according to the invention is continued with reference to the appended drawings, which are of illustrative and non-limiting value only, wherein.

DETAILED DESCRIPTION OF THE INVENTION

With reference to FIGS. 1 to 6, a hydraulic fast-coupling assembly according to the invention is described, which is generally referred to by reference number (100).

As mentioned previously, the hydraulic fast-coupling assembly (100) according to the invention has been particularly devised to solve the problems encountered in the machines of the prior art that are used for the cutting of sheet materials.

Figure 4A:
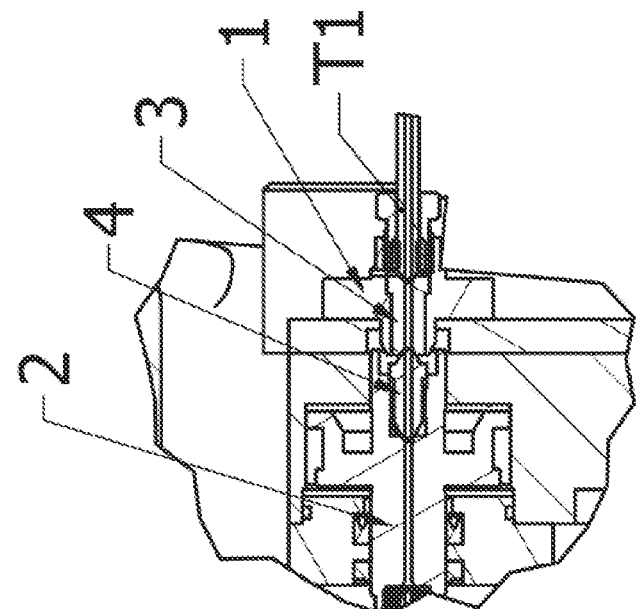
FIG. 4A is an enlarged view of the detail enclosed in the circle O of FIG. 4.
Figure 4:
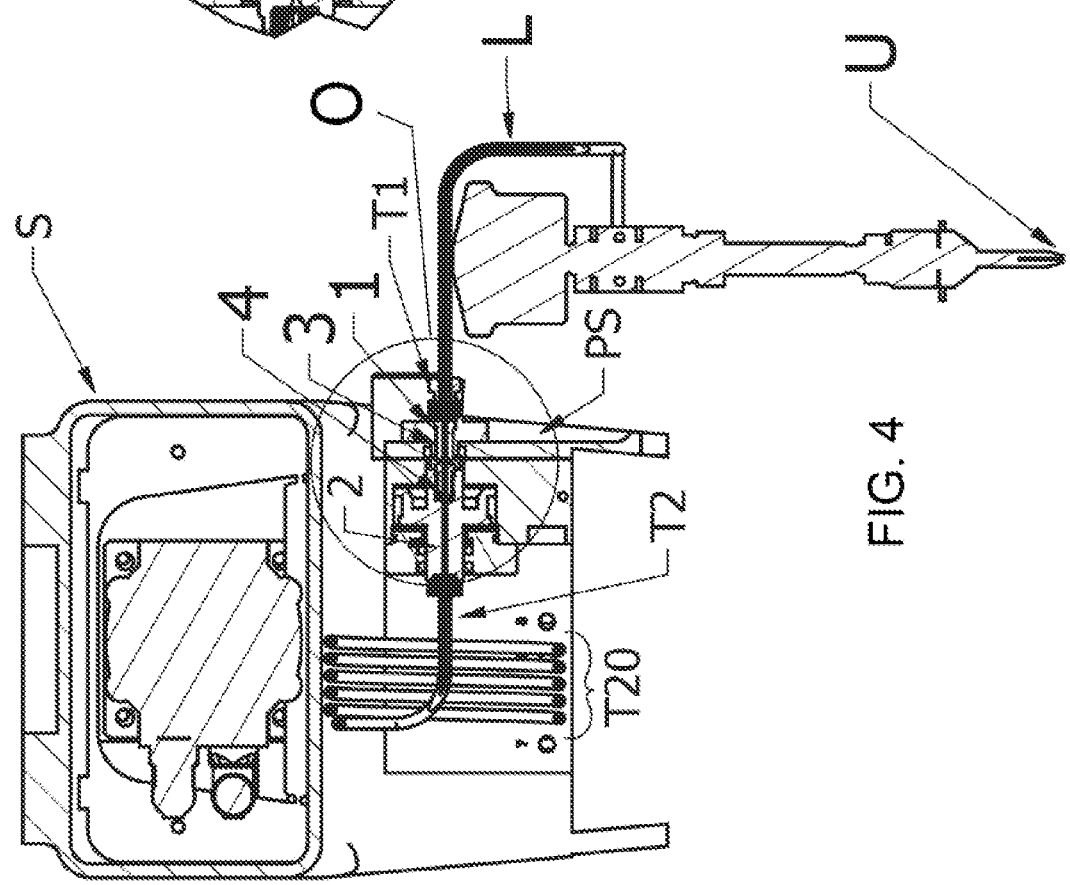
FIG. 4 is a side view of a supporting head of a cutting machine and of water jet cutting means mounted on said supporting head and connected by means of a fast-coupling assembly according to the invention and sectioned according to a plane passing through said fast-coupling assembly.
Figure 7:
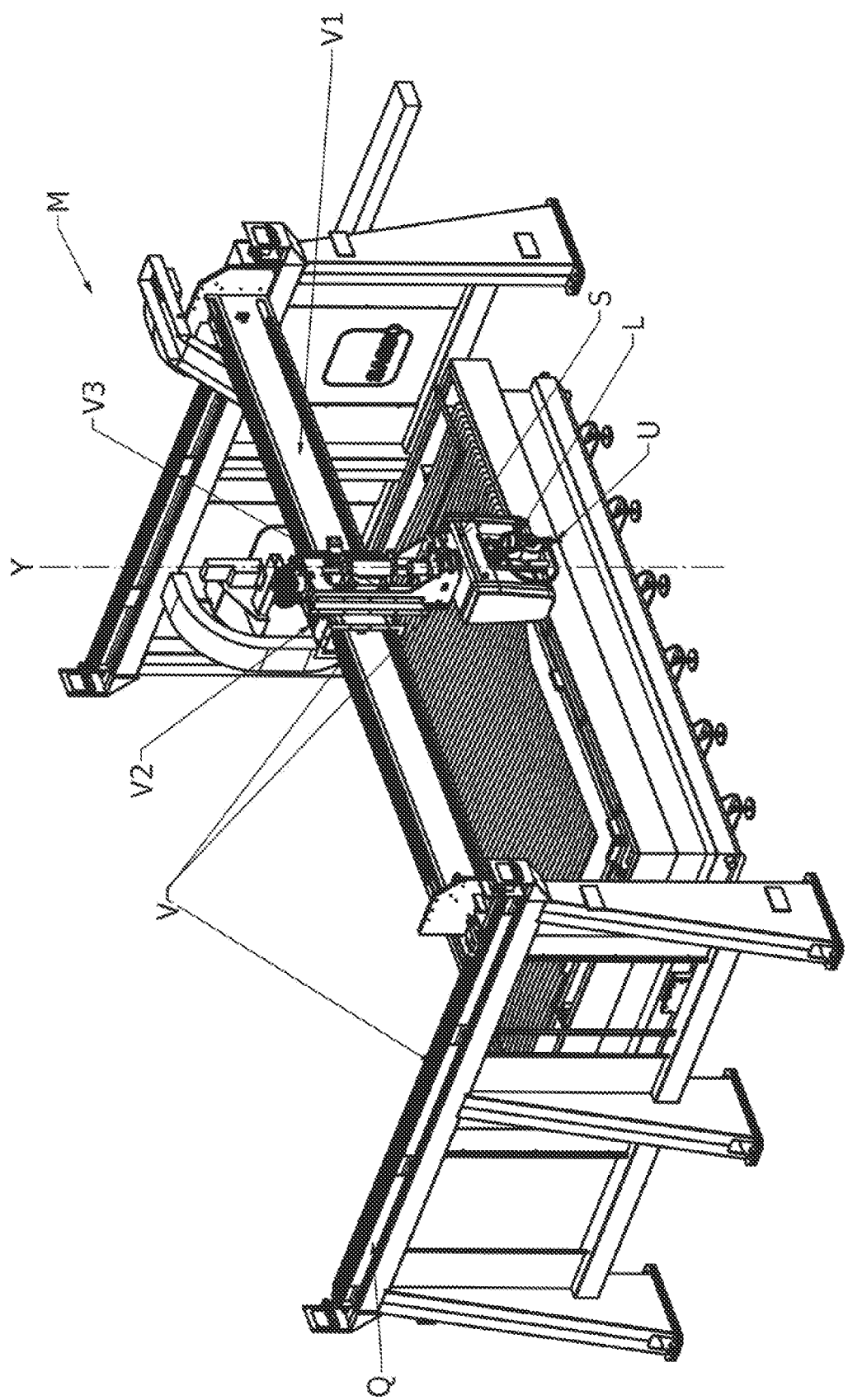
FIG. 7 is a view of a machine for cutting a sheet material comprising the supporting head shown in FIG. 4.

In particular, the hydraulic fast-coupling assembly (100) according to the invention has been devised for coupling a water jet cutting system (L) on a supporting head (S) (shown in FIGS. 4 and 4A) of a machine (M) used for the cutting of sheet materials, which is diagrammatically shown in FIG. 7.

Figure 1:
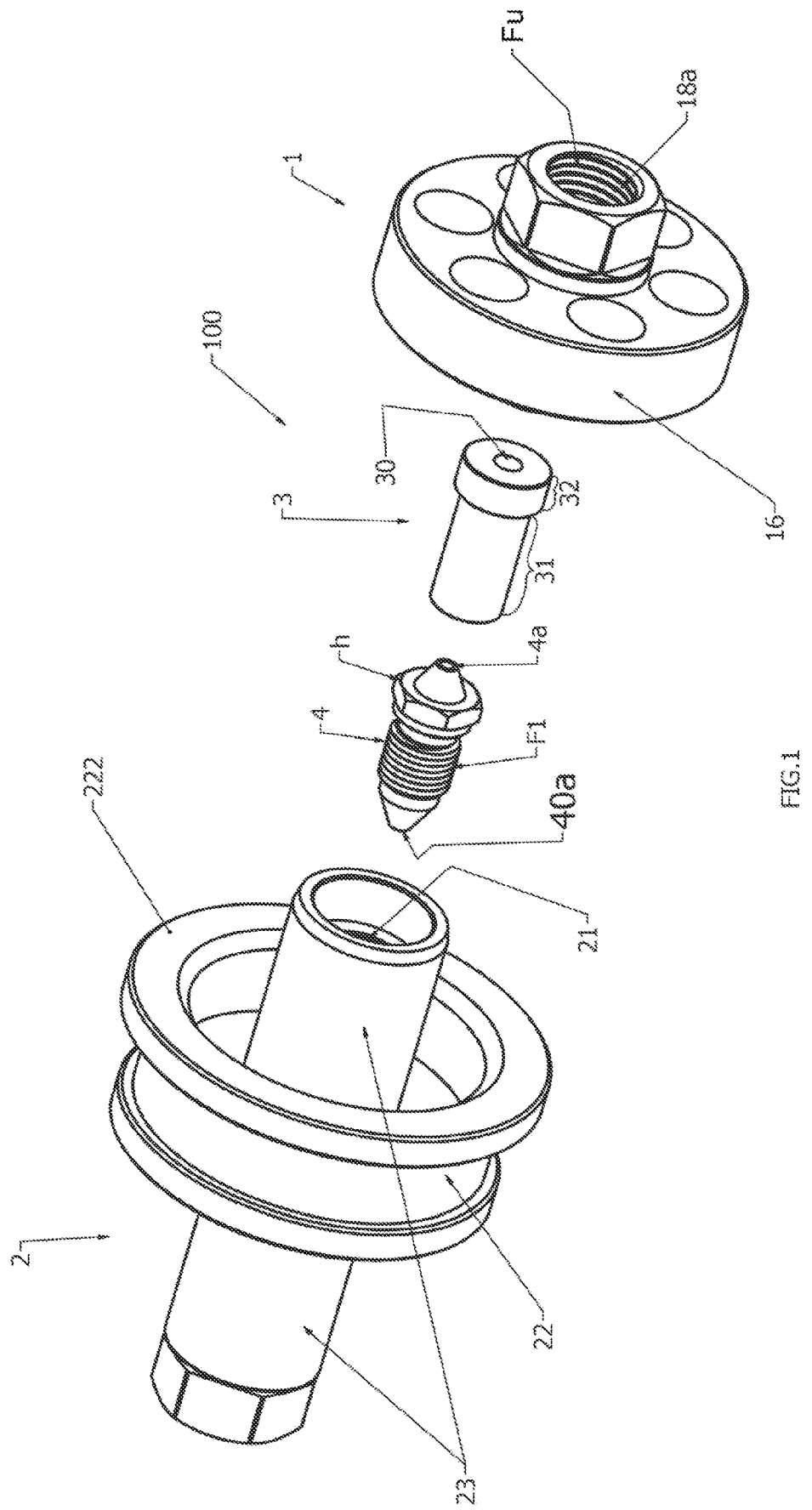
FIG. 1 is an exploded axonometric view of the fast-coupling assembly according to the invention.
Figure 2:
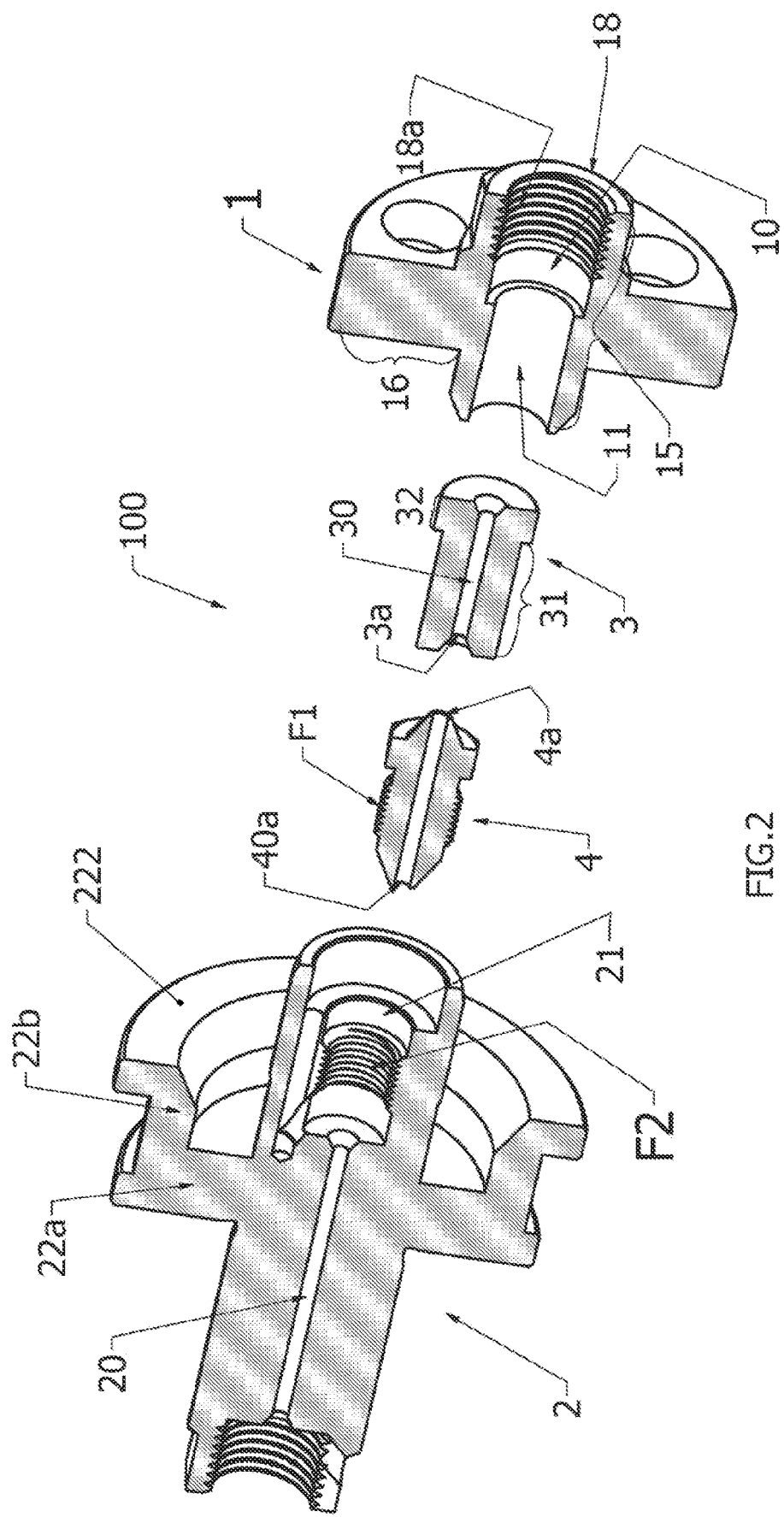
FIG. 2 is an exploded axonometric view of the fast-coupling assembly according to the invention, wherein all elements of the assembly are axially sectioned.
Figure 3:
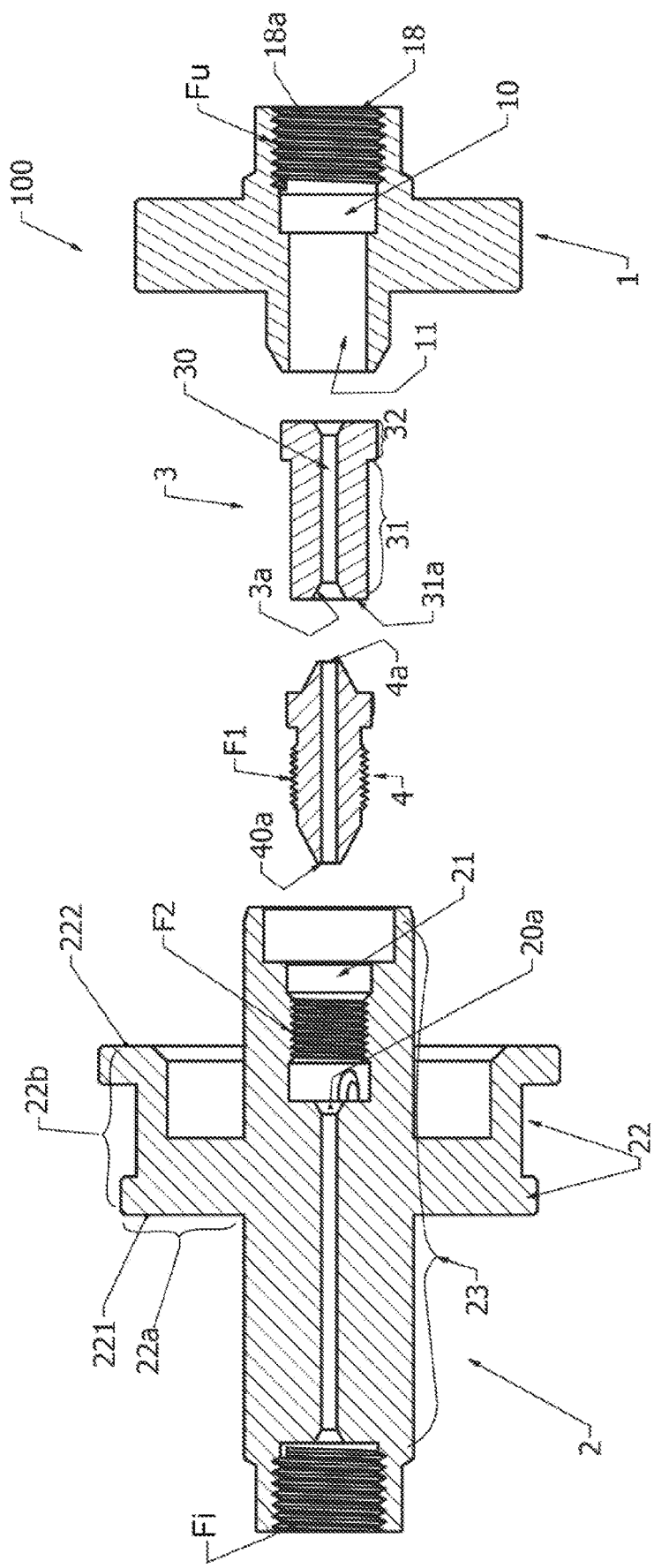
FIG. 3 is an exploded side view of the fast-coupling assembly according to the invention, wherein all elements of the assembly are axially sectioned.

Referring to FIGS. 1, 2 and 3, the hydraulic fast-coupling assembly (100) comprises a coupling element (1) suitable for being integral with the water jet cutting system (L) and for being coupled to the supporting head (S).

The coupling element (1) comprises a central duct (10) suitable for being in fluid communication with a nozzle (U) of the water jet cutting system (L).

The coupling element (1) comprises an annular flanged portion (15) suitable for being fastened by means of screws to a supporting plate (PS) of the water jet cutting system (L), and a central cylindrical portion (16) that crosses said annular flanged portion (15) from one side to the other side. Preferably, the central cylindrical portion (16) and the annular flanged portion (15) are machined in one piece.

The central duct (10) is formed in said central cylindrical portion (16).

The coupling element (1) comprises an outlet (18) having a coupling seat (18a) suitable for being coupled with a delivery pipe (T1) connected to the nozzle (U).

In particular, a thread (Fu) suitable for coupling with a thread of the delivery pipe (T1) is provided on the coupling seat (18a).

The hydraulic fast-coupling assembly (100) further comprises a mobile stem (2) suitable for being slidably mounted inside a seat (S1) (shown in FIGS. 5 and 6) formed on the supporting head (S).

The mobile stem (2) comprises an internal duct (20) and is suitable for being moved inside the seat (S1) between a retracted position (shown in FIG. 6), wherein said internal duct (20) and said central duct (10) are not connected, and an extracted position (shown in FIG. 5), wherein said internal duct (20) and said central duct (10) are connected to each other.

Said mobile stem (2) comprises a cylindrical central portion (23) wherein said internal duct (20) is formed and an annular protrusion (22) formed in one piece with each other.

Said annular protrusion (22) comprises a first abutment face (221) and a second abutment face (222) suitable for abutting against respective abutment walls (p1, p2) of the seat (S1).

Figure 5:
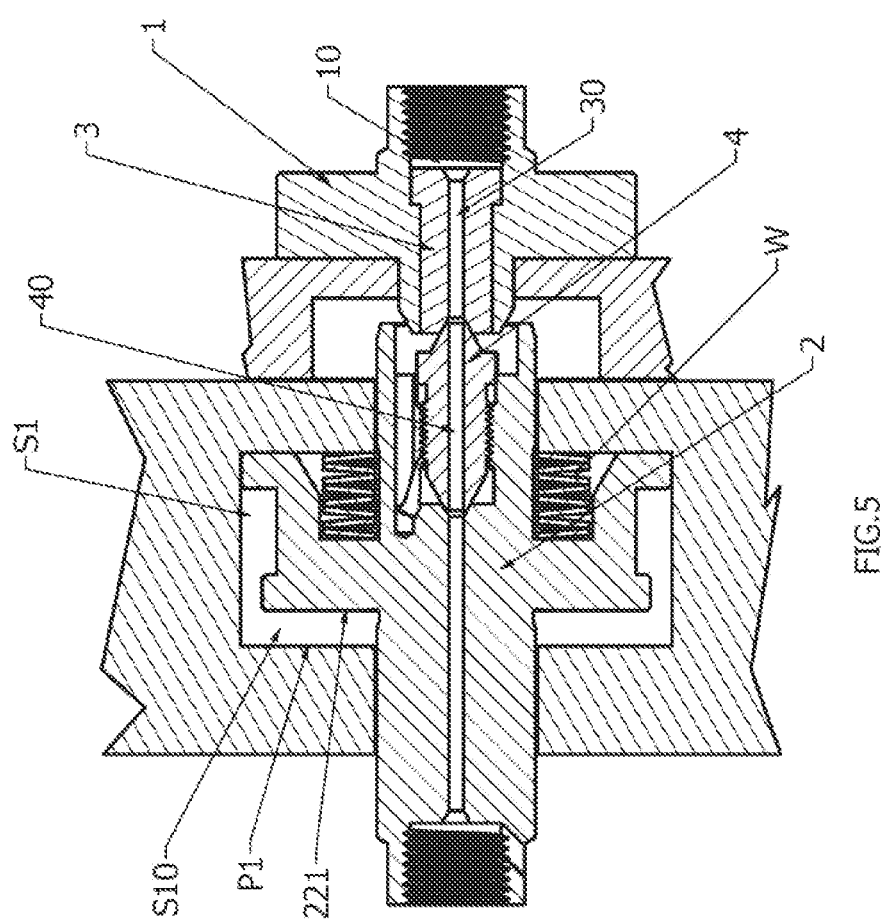
FIG. 5 and FIG. 6 are sectional views of the fast-coupling assembly according to the invention, wherein the mobile stem is mounted in a seat of the supporting head; in said FIGS. 5 and 6 the mobile stem is respectively disposed in extracted position and in retracted position.
Figure 6:
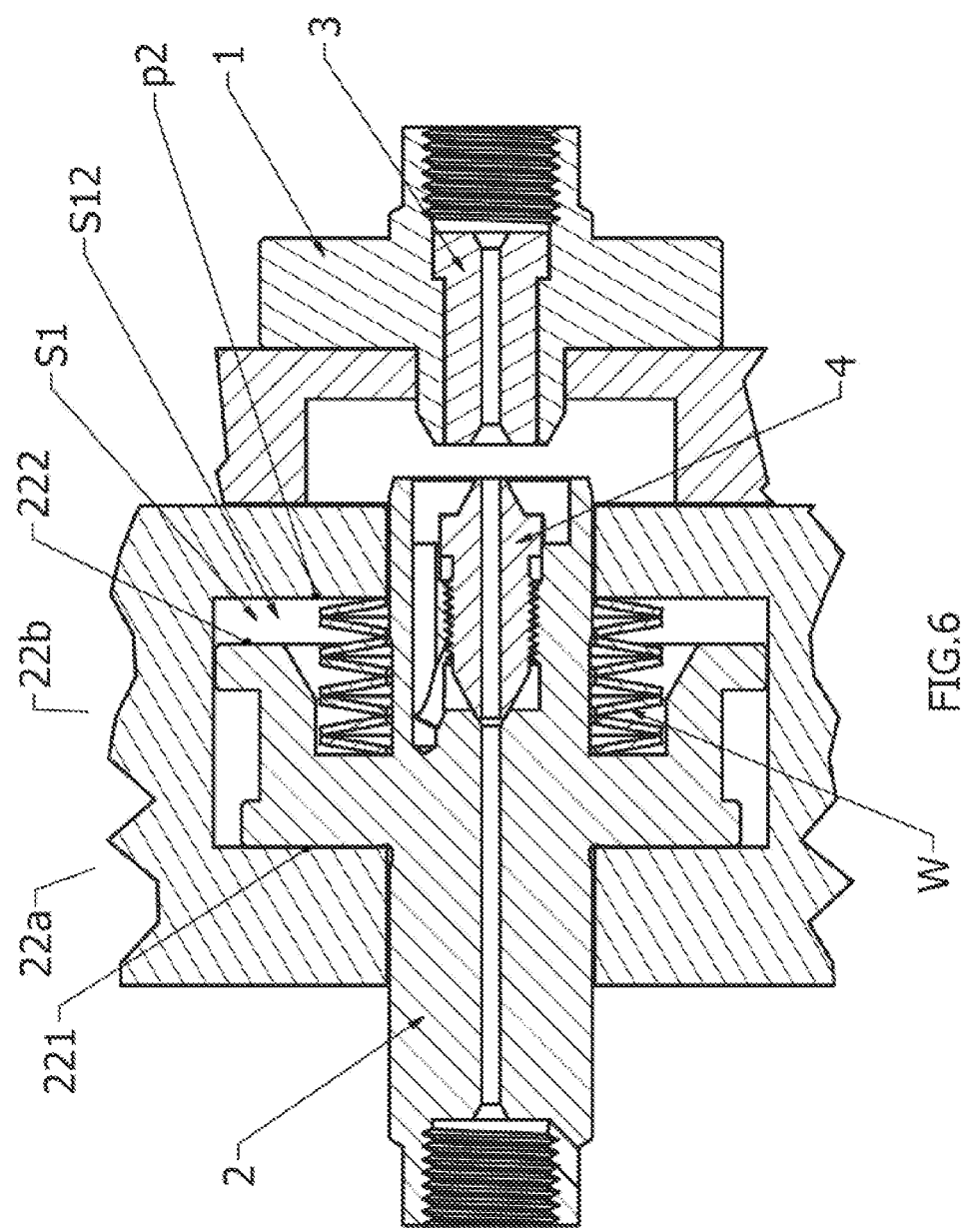

Specifically, said annular protrusion (22) comprises a bottom wall (22a) and a side wall (22b) which define, together with a section of the side wall of the central cylindrical portion (23), an annular seat whereon a spiral spring (W) is housed (see FIGS. 5 and 6).

Said bottom wall (22a) comprises a face, which faces the opposite direction with respect to the annular seat and coincides with said first abutment face (221), whereas said side wall (22b) has an end edge coincident with the second abutment face (222).

The annular protrusion (22) defines inside the seat (S1) two separate chambers (S11, S12) inside the seat (S1), namely a first chamber (S11) and a second chamber (S12).

The movement of the mobile stem (2) inside the seat (S1) is obtained by means of an oil-pressure system (not shown in the appended figures) comprising a pump that regulates the pressure of a fluid contained in the seat (S1), in such a way as to move the mobile stem (2) from the retracted position to the extracted position and vice versa.

The activation of the pump generates a pressure in the seat such that the mobile stem (2) is pushed into its extracted position so as to couple the mobile stem (2) and the coupling element (1) to each other.

The internal duct (20) is in fluid communication with a pipe (T2) suitable for being connected to a pump used to pump high pressure water inside the pipe (T2).

The pipe (T2) comprises a portion (T20) that is wound according to a spiral trajectory.

The pipe (T2) is connected to the mobile stem (2) in correspondence with a coupling seat (25a) which is formed on an inlet (25) of the mobile stem (2) in communication with the internal duct (20). A thread (fi) is obtained on the coupling seat (25a) and is suitable for being coupled with a thread provided on the pipe (T2) in such a way as to connect the pipe (T2) and the mobile stem (2).

Thus, the liquid pumped inside the pipe (T2) is firstly passed through the pipe (T2) and is then poured inside the internal duct (20).

The peculiarity of the hydraulic fast-coupling assembly (100) according to the invention is that is comprises at least one coupling (3, 4) interposed between said mobile stem (2) and said coupling element (1) and removably connected to said mobile stem (2) and/or to said coupling element (1). The at least one coupling (3, 4) comprises an axial duct (30, 40) that provides communication between said internal duct (20) of the mobile stem (2) and said central duct (10) of the coupling element (1).

In the preferred embodiment of the invention, the hydraulic fast-coupling assembly (100) comprises:
- a first coupling (3) removably connected to said coupling element (1); and
- a second coupling (4) removably connected to said mobile stem (2).

The two couplings (3, 4) comprise coupling means (3a, 4a) which provide mutual coupling.

Referring to FIG. 3, the coupling means (3a, 4a) comprise a conical mouth (3a), which is obtained on the first coupling (3), and a conical tip (4a), which is obtained on the second coupling (4) and is suitable for being inserted into said conical mouth (3a).

It should be noted that, in an alternative form of the invention (not shown in the appended figures), the position of the conical mouth (3a) and of the conical tip (4a) can be inverted. More precisely, in an alternative embodiment of the invention, said conical mouth (3a) can be obtained in said second coupling (4), whereas said conical tip (4a) can be obtained in said first coupling (3).

By positioning the mobile stem (2) in its extracted position, the conical tip (4a) is inserted in the conical mouth (3a), providing communication between the internal duct (20) and the central duct (10).

Therefore, when the pump is activated, the water flows first in the pipe (T2), then in the central duct (10), then in the axial duct (40) of the second coupling (4), then in the axial duct (30) of the first coupling (3), then in the delivery pipe (T1) and is finally ejected from the nozzle (U).

Referring to FIGS. 2 and 3, the mobile stem (2) comprises a seat (21) wherein said internal duct (20) of the mobile stem (2) ends and wherein said second coupling (4) is housed.

Still referring to FIGS. 2 and 3, the seat (21) and the second coupling (4) comprise a thread (F1, F2) that provides a threaded connection between the second coupling (4) and the mobile stem (2).

Preferably, the internal duct (20) is provided with a conical inlet (20a) at one end that ends into said seat (21). Accordingly, the second coupling (4) comprises a conical inlet (40a) (opposite to said conical tip (4a)) which is suitably configured for coupling with said conical inlet (20a) of the internal duct (20) when the second coupling (4) is fully screwed inside the seat (21) of the mobile stem (2).

Now referring to the coupling element (1) and to the first coupling (3), the coupling element (1) comprises a hole (11) communicating and coaxial with said central duct (10) wherein said first coupling (3) is coupled by interference.

The first coupling (3) has a substantially "T" shape in longitudinal section and comprises a shank (31) and an enlarged head (32).

The shank (31) is fitted inside the hole (11), whereas said enlarged head (32) is housed in said central duct (10) and is abutting against a perimeter edge that defines an inlet section of the hole (11).

Said conical mouth (3a) is obtained on one end (31a) of the shank (31) of the first coupling (3).

Referring to FIG. 7, a further object of the present invention is a machine (M) comprising:
- a supporting structure (Q);
- a supporting head (S) (shown in FIG. 4) connected to said supporting structure (Q) and comprising a seat (S1);
- actuation means (V) supported by the supporting structure (Q) and suitably configured to move said supporting head (S);
- a water jet cutting system (L);
- a fast-coupling assembly (100) like the one that is described above.

The mobile stem (2) is slidably mounted inside the seat (S1) of the supporting head (S), whereas the coupling element (1) is attached to the water jet cutting system (L).

The supporting structure (Q) comprises two side frames, and said actuation means (V) comprise:
- an upper beam (V1) slidably mounted above the two side frames;
- a sliding carriage (V2) slidably mounted along said upper beam (V1);
- a mobile upright (V3) that supports the supporting head (S) and is connected to the sliding carriage (V2) by means of an actuator (not shown in FIG. 7) which moves the mobile upright (V3) along a vertical axis (Y) in such a way that said supporting head (S) can be moved in up-down direction, in proximal or distal position with respect to the workbench.

Preferably, said actuation means (V) also comprise rotation means arranged between said mobile upright (V3) and said supporting head (S) to rotate the supporting head (S) relative to the mobile upright (V3) about the vertical axis (Y).

Although FIG. 7 illustrates a specific example of a machine (M) provided with the supporting structure, the supporting head (S) whereon the hydraulic fast-coupling assembly (100) is to be mounted can be supported and moved by a robot with three rotary axes, or by a mixed robot with linear axes and rotary axes or by an anthropomorphic robot.

Following the foregoing description, the advantages contributed by the present invention appear obvious Because of the provision of the two removable couplings (3, 4), one being connected to the coupling element (1) and the other being connected to the mobile stem (2), in case of impurities, surface oxidation or small dents between the contact surfaces of the two couplings (3, 4), it is no longer necessary to replace the entire mobile stem (2) or the coupling element (1) and only the two couplings (3, 4) need to be replaced. Therefore, the replacement of the two couplings (3, 4) is much simpler and faster than the replacement of the mobile stem (2) or of the coupling element (1) according to the prior art. Such a replacement is so simple that it can be carried out by any user without requiring the presence of specialized and qualified operators.

In order to appreciate the aforementioned advantages, the following is a brief description of the way in which the two couplings (3, 4) are replaced.

First of all, the coupling element (1) and the mobile stem (2) must be uncoupled and separated from each other.

Once the two elements have been uncoupled and moved apart, the first coupling (3) is disassembled from the coupling element (1) and the second coupling (4) is disassembled from the mobile stem (2).

With regard to the first coupling (3), it is necessary to unscrew the delivery pipe (T1) first and then exert such a push on the end (31a) of the shank (31) as to disengage the first coupling (3) from the hole (11) so that it can be extracted from the coupling seat (18a).

With regard to the second coupling (4), it is necessary to unscrew the second coupling (4) with a tool (such as a ratchet wrench) suitable for gripping a polygonal portion (h). Preferably, said polygonal portion (h) has a hexagonal section and comprises six faces whereon the tool itself grips.

Once the two couplings (3, 4) have been extracted, a new first coupling (3) is forcedly inserted into the hole (11) and a new second coupling (4) is screwed inside the seat (21).

It should be noted that although in the appended figures the hydraulic fast-coupling assembly (100) always comprises two couplings (3, 4) (one being mounted on the coupling element (1) and the other being mounted on the mobile stem (2)), there is nothing to prevent the hydraulic fast-coupling assembly (100) from being equipped with only one coupling (3, 4) mounted on the coupling element (1) or on the mobile stem (2).

Finally, it is important to note that, even if it has always been assumed that the new hydraulic fast-coupling assembly (100) is used for coupling a water jet cutting system (L) to a supporting head of a machine used for the cutting of sheets, there is nothing to prevent the inventive idea of the present invention from being advantageously used also for different purposes, without departing from the same inventive idea.

Considering that the aforesaid peculiar inventive idea is that of providing the assembly with two couplings that can be easily disassembled, it appears evident that a similar logic principle can also be exploited for the realization of hydraulic joints and couplings of any kind.

I claim:

1. A hydraulic fast-coupling assembly for coupling a water jet cutting system to a supporting head of a machine, the hydraulic fast coupling assembly comprising:
   a coupling element adapted to be integral with the water jet cutting system and to be coupled to the supporting head, said coupling element having a central duct adapted to be in fluid communication with a nozzle of the water jet cutting system;
   a mobile stem adapted to be slidably mountable inside a seat on the supporting head, said mobile stem having an internal duct, said mobile stem adapted to be movable inside the seat between a retracted position and an extended position, wherein the internal duct of said mobile stem and the central duct of said coupling element are not connected in the retracted position, the internal duct of said mobile stem and the central duct of said coupling element being connected in the extended position; and
   at least one coupling disposed between said mobile stem and said coupling element, said at least one coupling being removably connected to said mobile stem or to said coupling element, said at least one coupling having an axial duct that communicates with the internal duct of said mobile stem and with the central duct of said coupling element, said at least one coupling comprising:
   a first coupling removably connected to said coupling element; and
   a second coupling removably connected to said mobile stem, wherein said first coupling is coupled to said second coupling.

2. The hydraulic fast-coupling assembly of claim 1, wherein one of said first coupling and said second coupling has a conical mouth, another of said first coupling and said second coupling having a conical tip, the conical tip being insertable into the conical mouth.

3. The hydraulic fast-coupling assembly of claim 2, wherein the conical mouth is formed in said first coupling, the conical tip being formed in said second coupling.

4. The hydraulic fast-coupling assembly of claim 3, wherein said mobile stem has the seat at an end of the internal duct, the seat housing said second coupling.

5. The hydraulic fast-coupling assembly of claim 4, wherein the seat of said mobile stem has a thread that threadedly connects said second coupling with said mobile stem.

6. The hydraulic fast-coupling assembly of claim 5, the internal duct of said mobile stem has a conical inlet leads to the seat of said mobile stem, the conical tip of said second coupling being insertable and coupleable with the conical inlet of said mobile stem.

7. The hydraulic fast-coupling assembly of claim 2, wherein said coupling element has a hole in communication with and coaxial with the internal duct of said mobile stem, said first coupling fitted in the hole of said coupling element.

8. The hydraulic fast-coupling assembly of claim 1, wherein said mobile stem has an inlet adapted to be coupled to an inlet pipe.

9. The hydraulic fast-coupling assembly of claim 1, wherein said coupling element has an outlet adapted to be coupled to a delivery pipe of the nozzle.

* * * * *